US012693755B2

(12) United States Patent
Darthenay et al.

(10) Patent No.: US 12,693,755 B2
(45) Date of Patent: Jul. 28, 2026

(54) TOUCH PANEL SYSTEM USING MODULATED SIGNALS AS DRIVE SIGNALS

(71) Applicant: NXP B.V., Eindhoven (NL)

(72) Inventors: Frederic Darthenay, Luc sur Mer (FR); Jean-Robert Tourret, Cormelles le Royal (FR); Franck Goussin, Blainville sur Orne (FR); Vincent Geffroy, Cuverville (FR)

(73) Assignee: NXP B.V., Eindhoven (NL)

( * ) Notice: Subject to any disclaimer, the term of this patent is extended or adjusted under 35 U.S.C. 154(b) by 92 days.

(21) Appl. No.: 18/595,499

(22) Filed: Mar. 5, 2024

(65) Prior Publication Data

US 2024/0302915 A1 Sep. 12, 2024

(30) Foreign Application Priority Data

Mar. 7, 2023 (EP) .................................... 23305300

(51) Int. Cl.
G06F 3/041 (2006.01)
G06F 3/044 (2006.01)
(52) U.S. Cl.
CPC .......... G06F 3/0416 (2013.01); G06F 3/0446 (2019.05); *G06F 2203/04111* (2013.01)
(58) Field of Classification Search
None
See application file for complete search history.

(56) References Cited

U.S. PATENT DOCUMENTS

| | | | |
|---|---|---|---|
| 8,970,544 B1 | 3/2015 | Mohindra | |
| 9,007,341 B2 | 4/2015 | Lin et al. | |
| 2012/0056841 A1 | 3/2012 | Krenik et al. | |
| 2014/0055413 A1* | 2/2014 | Krenik | G06F 3/044 |
| | | | 345/174 |
| 2014/0267143 A1 | 9/2014 | Worfolk et al. | |
| 2019/0129569 A1 | 5/2019 | Chou et al. | |

OTHER PUBLICATIONS

U.S. Appl. No. 18/664,150, Darthenay et al., "Capacitive Touch Screens," filed May 14, 2024.

(Continued)

*Primary Examiner* — Brian M Butcher

(57) ABSTRACT

A touch panel includes a first plurality of electrodes and a second plurality of electrodes. A plurality of transmitters generate a plurality of transmit signals by modulating a common sine wave signal with a set of orthogonal modulation signals, and drive each transmit signal onto a corresponding electrode of the first plurality of electrodes. Each transmit signal is generated by modulating the common sine wave signal with a unique orthogonal modulation signal of the set of orthogonal modulation signals. At least two of the plurality of transmit signals are not orthogonal. Each receiver of a plurality of receivers senses a receive signal on a corresponding electrode of the second plurality of electrodes and generates a set of correlation signals by correlating the receive signal with each transmit signal of the plurality of transmit signals. The sets of correlation signals are used to detect a touch event on the touch panel.

18 Claims, 8 Drawing Sheets

(56) References Cited

OTHER PUBLICATIONS

U.S. Appl. No. 18/675,524, Raschbacher et al., Test Methods for Capacitive Touch Screens, and Capacitive Touch Screen Assemblies, filed May 28, 2024.
U.S. Appl. No. 18/587,195, Goussin et al., "Touch Panel Location Detection With Different Frequency-Phase Offset Combinations of Electrode Signals," filed Feb. 26, 2024.
U.S. Appl. No. 18/587,195, "Touch Panel Location Detection With Different Frequency-Phase Offset Combinations of Electrode Signals," filed Feb. 26, 2024.

* cited by examiner

TOUCH PANEL SYSTEM USING MODULATED SIGNALS AS DRIVE SIGNALS

CROSS-REFERENCE TO RELATED APPLICATIONS

This application claims the priority under 35 U.S.C. § 119 of European Patent application no. 23305300.8, filed on 7 Mar. 2023, the contents of which are incorporated by reference herein.

BACKGROUND

Field

This disclosure relates generally to touch panel systems, and more specifically, to a touch panel system using modulated signals to drive electrodes of a touch panel.

Related Art

Some capacitive touch panels utilize internal electrodes organized into rows and columns for providing an indication of a touch location on the panel based on transmit signals provided to row electrodes and receive signals sensed on column electrodes, in which there exists a coupling capacitance (referred to as Cm) and a parasitic capacitance (referred to as Cself) at each row/column crosspoint. When a touch happens or an external object approaches, the coupling and parasitic capacitances change so the amount of coupling between the row and column changes, as well as the amount of coupling to ground. Therefore, the receive signals are monitored to detect changes. Detection of the coupling change between row and column is referred to as "mutual detection" while detection of the amount of change between ground and the row or column is referred to as "self detection."

For example, in a known touch panel system, a touch situation is detected by injecting a plurality of orthogonal sine wave tones, each having a different frequency, at one edge of the panel (driven onto the rows, each row receiving a unique frequency), and measuring the coupling at the bottom of the panel (sensed at each column) in order to obtain the residual amplitude for each tone and comparing the total residual amplitude of the column to the untouched situation. However, as touch panels increase in size, signal attenuation occurs along the length of the longer rows due, for example, to interconnect resistance. Also, as the panel size increases, the parasitics play an increased role in making the frequency band of interest smaller and further increasing attenuation. This makes measuring the coupling using the receive signals increasingly difficult, reducing accuracy and reliability of touch detection on the touch panel.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a touch panel includes a first plurality of electrodes corresponding to rows and a second plurality of electrodes corresponding to columns, in which the first and second plurality of electrodes define a plurality of crosspoints. Each crosspoint is defined by an electrode of the first plurality of electrodes crossing an electrode of the second plurality of electrodes. Each electrode is attached to a transceiver which includes both a transmitter and a receiver. A plurality of transmit signals are generated by modulating a common carrier sine wave signal with a set of orthogonal modulation signals. Each transmit signal is therefore generated by modulating the common sine wave signal with a unique orthogonal modulation signal of the set of orthogonal modulation signals, and is driven onto a corresponding electrode of the first plurality of electrodes. In this manner, while the set of orthogonal modulation signals are all orthogonal to each other, the resulting transmit signals which are actually driven or injected onto the first plurality of electrodes are not necessarily orthogonal to each other. That is, two or more of the transmit signals are not orthogonal to each other. In one embodiment, none are orthogonal with each other. However, by modulating a common sine wave with a set of orthogonal signals to generate the set of transmit signals (also referred to as drive signals since they are driven onto the electrodes), each of the transmit signals shares the same bandwidth, i.e. the panel's bandwidth, and are thus all affected the same way by the panel.

In one embodiment, the set of orthogonal modulation signals can be implemented as a set of orthogonal sine waves, each orthogonal sine wave having a unique frequency from the other orthogonal sine waves (and any initial phase), in which phase modulation is obtained from the sine waves (referred to as SIN-SIN modulation). In another embodiment, the set of orthogonal modulation signals can be implemented as a set of orthogonal bit codes, in which either phase modulation (referred to as ORTHO-PHASE modulation) or frequency modulation (referred to as ORTHO-FREQ modulation) can be obtained from the orthogonal codes.

Figure 1:
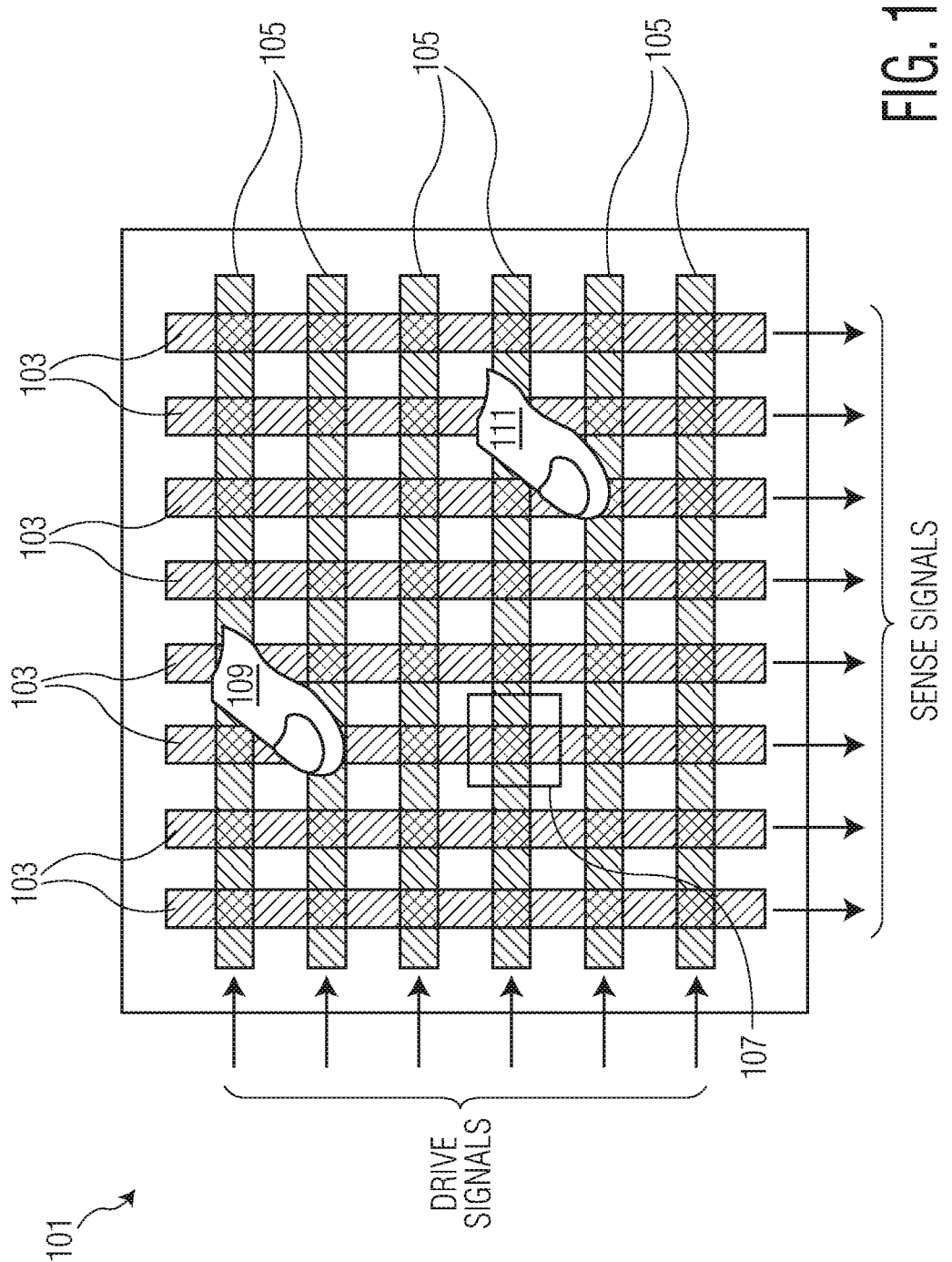
FIG. 1 illustrates a top view of a touch panel.

FIG. 1 illustrates a top view of a touch panel 101 with representations of fingers 109 and 111 touching different locations on panel 101. Panel 101 includes "row" electrodes 105 located in a horizontal orientation relative to the view of FIG. 1 and "column" electrodes 103 located in a vertical orientation in the view of FIG. 1. During a touch location detection mode of operation, transmit signals (i.e. drive signals) are driven onto electrodes 105 which generate resulting receive signals (i.e. sense signals) on electrodes 103 that are sensed to determine the touch location of fingers 109 and 111 on the panel. By detecting specific changes in the sense signals on electrodes 103, a determination can be made where a finger is touching (or is in close proximately to) a panel for activating an action designated to be performed as a result of the finger the specific location. This detection method depicts "mutual detection." (In another aspect, transmit signals on electrodes 103 and 105 are also received on electrodes 103 and 105. By detecting specific changes, a determination can be made which row(s) and which column(s) have been touched, in which this detection method depicts "self detection." In one embodiment, the mutual detection method can be used to fine tune the location of a touch determined by the self detection method.)

Referring to mutual detection, each receive signal on a column electrode of electrodes 103 is affected by the transmit signals of the row electrodes 105 that intersect with the column electrode. A touch by a finger (or other object such as a stylus) at a location along where a row electrode intersects with a column electrode will alter the receive signal of the column electrode. A "crosspoint" refers to a location on a panel located at a crossing (e.g. an intersection) of two electrodes coupled by a mutual capacitance where a touch event alters the effect of a drive current of one of the electrodes on the sense current of the other electrode. For example, at a crosspoint, one electrode crosses an electrical field surrounding the other electrode. Note that as used herein, an "intersection" of two electrodes does not refer to a physical intersection of the two coupled electrodes, but where one electrode crosses another electrode, in which the two coupled electrodes are separated by a dielectric material (i.e. are formed in dielectrically isolated layers). Note also that one electrode can cross another in different planes, or two coupled electrodes can cross in the same plane (i.e. be coplanar). The location of the touch can be determined by how the receive signal is altered due to the touch.

Figures 2, 3:
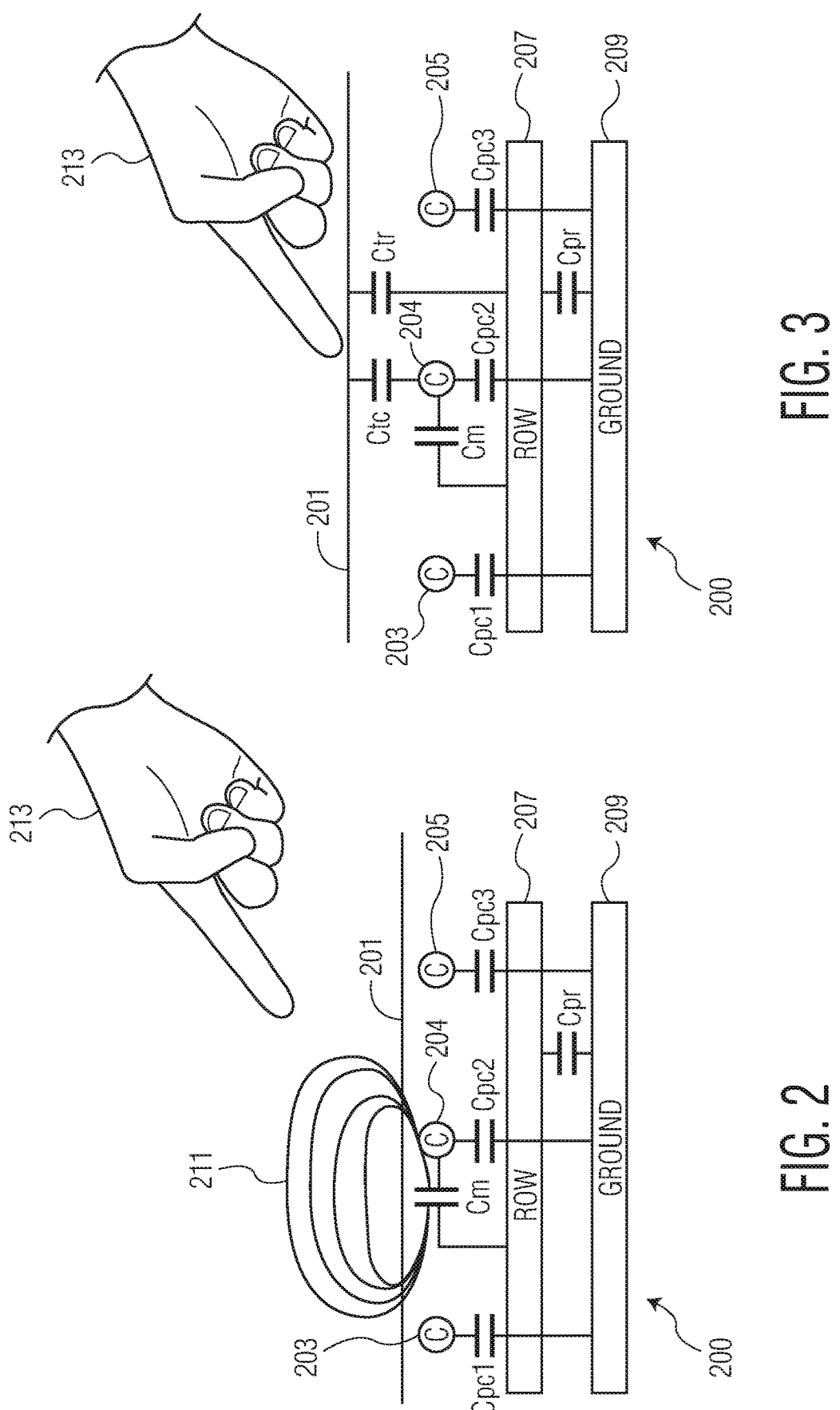
FIGS. 2 and 3 illustrate partial cross-sections of a touch panel illustrated the change in capacitance due to a finger in proximity to a crosspoint.

FIGS. 2 and 3 illustrate cross-sectional views of a touch panel 200 showing how an object touching the panel can affect the capacitance of the electrodes of the panel. In FIGS. 2 and 3, panel 200 includes column electrodes 203-205 that are located in one layer of the panel (orientated into and out of the page in the view of FIGS. 2 and 3). A row electrode 207 is located below column electrodes 203-205 and runs in a perpendicular orientation. The electrodes are located below a layer of glass 201. A ground plane 209 is located below row electrode 207. Dielectric material (not shown) physically separates the electrodes and ground plane 209. Note that the columns may instead be located between glass 201 and the rows.

As shown in FIG. 2, finger 213 is located away from panel 200 such that finger 213 does not perturb the electrical field lines 211 that surround the mutual capacitance (represented by capacitor symbol Cm) between electrode 204 and electrode 207 that occurs at a crosspoint where column electrode 204 crosses (e.g. intersects) row electrode 207. Capacitor symbol Cpc1 represents a bulk capacitance between electrode 203 and ground plane 209. Capacitor symbol Cpc2 represents a bulk capacitance between electrode 204 and ground plane 209, and capacitor symbol Cpc3 represents a bulk capacitance between electrode 205 and ground plane 209. The bulk capacitances are the parasitic capacitances of the bulk (i.e. the substrate).

FIG. 3 shows finger 213 in contact with glass 201 at the crosspoint where column electrode 204 intersects row electrode 207. Because finger 213 can be considered another electrode, in which a capacitance (represented by capacitor symbol Ctr) is formed between finger 213 and row electrode 207 and a capacitance (represented by capacitor symbol Ctc) is formed between finger 213 and column electrode 204. These capacitances (Ctr and Ctc) are in parallel with capacitances Cpr and Cpc, respectfully, and therefore makes the bulk capacitances increase.

Finger 213 perturbs the electric field lines 211 of the mutual capacitance Cm between electrodes 204 and 207, thus decreasing the mutual capacitance Cm. This decrease in the mutual capacitance between a column electrode 204 and a row electrode 207 during a touch location detection mode changes the coupling between the signals on electrodes 207 and 204. In one example, the change in coupling results in a change in amplitude of the receive signal of the column (column electrode 204). Accordingly, by monitoring changes in amplitude in the column electrode (204) during a touch location detection mode, a determination can be made as to whether a touch event happened at the crosspoint of the two electrodes (204 and 207). Also, finger 213 being in proximity or in touch with panel 200 increases the self capacitance formed by Cpr and Cpc that are detuned. Accordingly, by monitoring changes in amplitude in the column electrode (204) or row electrode (207) during a touch location detection mode, a determination can be made as to whether a touch event happened on the column or the row. As will be described below, both the mutual detection and self detection can be performed to better identify the occurrence and location of a touch event.

Figure 4:
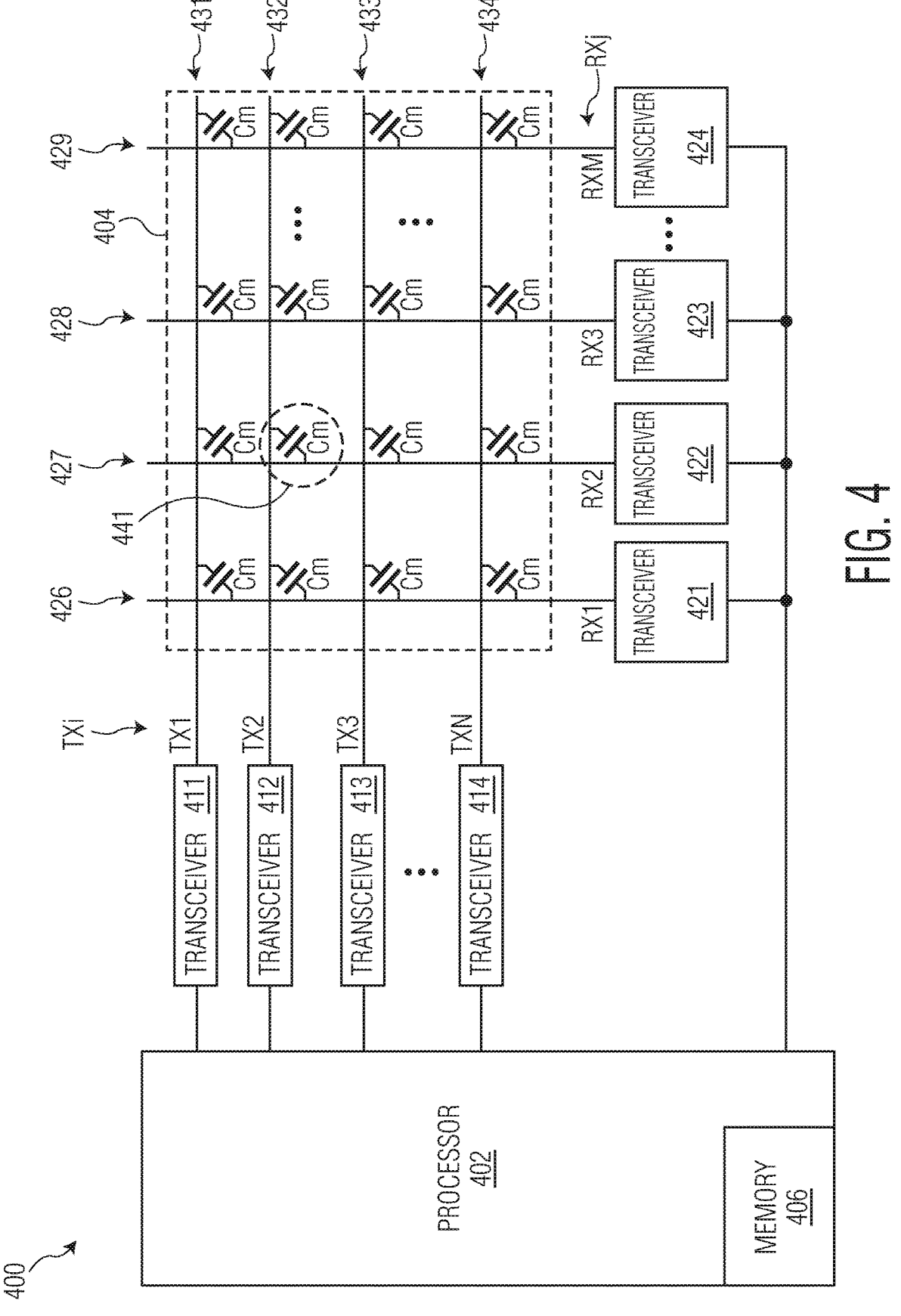
FIG. 4 illustrates, in block diagram form, a touch panel system in accordance with one embodiment of the present invention.

FIG. 4 illustrates a block diagram of a touch panel system 400 in accordance with one embodiment of the present invention. System 400 includes a touch panel 404 which includes N row electrodes (431-434) and M column electrodes (426-429) which are located in different layers of a panel and are oriented orthogonally with respect to each other (in which N and M can each be any positive integer numbers). In one embodiment, the row and column electrodes are formed from a transparent conductive material such as indium tin oxide or antimony tin oxide, although in other embodiments, the electrodes may be formed of other transparent conductive materials or non transparent conductive materials (e.g. copper). System 400 also includes transceivers 411-414 coupled to the N row electrodes, each of these transceivers coupled to a corresponding row electrode, and transceivers 421-424 coupled to the M column electrodes, each of these transceivers coupled to a corresponding column electrode. Each transceiver (411-414 and 421-424) may include both a transmitter for generating transmit signals on the corresponding electrode and a receiver for sensing receive signals on the corresponding electrode. Therefore, in the context of generating and driving transmit signals, a transceiver may be referred to simply as a transmitter, while in the context of sensing receive signals, a transceiver may be referred to simply as a receiver.

In one embodiment, electrodes 426-429 and electrodes 431-434 are located on top of controllable display devices (e.g. LEDs, or OLEDs—not shown) embedded in panel 404 such that images may be displayed on panel 404 to a user. In addition to displaying information, such images may direct a user to touch certain locations of the screen to initiate specific actions. For example, system 400 may be implanted as a control panel in a vehicle, where panel 404 would display "buttons" that when activated, initiate climate control or infotainment actions for the vehicle. In other embodiments, panel 404 may display a map where a user can touch one or more locations simultaneously to adjust the scale of the map or to change other features of the map. However, touch panel system 400 may be used in other applications such as entertainment, communications, graphical interface, or for system control. In some embodiments, panel 404 may include a "fixed" background where the information displayed behind the panels does not change.

In the illustrated embodiment, row electrodes 431-434 and column electrodes 426-429 are arranged as a grid and intersect at crosspoint locations of the grid. At each crosspoint, the row electrode and the column electrode have a mutual capacitance (Cm) with each other such that changes in the mutual capacitance can be used to determine that a touch (i.e. touch event) has occurred at that location. Each row electrode and each column electrode also have associated self capacitances (parasitic capacitances Cpr and Cpc), which are not illustrated in FIG. 4 so as not to complicate the drawing. Although panel 404 is shown as having four row electrodes (431-434) and four column electrodes (426-429), as mentioned above, a touch panel may include any number (N) of rows and any number (M) of columns. In the illustrated embodiment, M is greater than N, where, in one embodiment, touch panel 404 is much wider than its height (e.g. M is much greater than N, such as at least three times, or at least five times, greater than N). In an alternate embodiment, depending on the orientation of the touch panel 404, the N electrodes may instead be implemented as the column electrodes and the M electrodes as the row electrodes. Also, in alternate embodiments, the electrode may have a different arrangement other than the regular grid illustrated in FIG. 4. For example, in some embodiments, the electrodes may form an irregular grid in which the rows or the columns are not parallel (i.e. in which the rows and columns are not perpendicular with each other), or be arranged in other manners (e.g., diagonally, in circles, or in different layers) to provide crosspoints for touch event location detection. For example, in one embodiment, two coupled electrodes can be coplanar, such as by implementing the electrodes as a circle surrounding another circle.

Referring to the aspect of "mutual detection" (without "self detection"), transceivers 411-414 generate and drive transmit signals (TX1-TXN), each driven onto a corresponding row electrode, and transceivers 421-424 sense receive signals (RX1-RXM), each sensed on a corresponding column electrode. Based on the transmit signals from transceivers 411-414, each receive signal represents, for the corresponding column electrode, the sum of the coupling effects of the N transmit signals (i.e. N modulated signals) driven on the row electrodes which cross the corresponding column electrode. The receive signals are demodulated and correlated with all possible modulated transmit signals to extract the amount of coupling, which is used by processor 402 to determine changes in correlation due to a touch event at one or more crosspoints located along the column electrode. For example, in one embodiment, if there is no touch on any of the crosspoints of a column, the demodulated receive signal for that column indicates a correlation value in an expected range of "no touch situation" values, but if there is a touch on one or more of the crosspoints of the column, the demodulated receive signal for the column will reflect a change such that the correlation value will be outside the expected range of "no touch" values, in which the amount of change of the correlation value may indicate an amount of touch for the touch situation (i.e. the touch event). In one embodiment, as will be described below, the correlation values of the demodulated receive signals indicate corresponding amplitude values of the demodulated receive signals. In one embodiment, each of transceivers 411-414 and each of transceivers 421-424 include both analog and digital circuitry.

Processor 402 of system 400 may include a one or more processor cores which execute code for controlling the operations of system 400 and for processing and analyzing the correlation values from the transceivers. System 400 includes a memory 405 for storing executable code and for storing working data produced from the operations of panel system 400. In some embodiments, system 400 utilizes the amplitude information provided by the correlation values to identify touch events at crosspoints of panel 404. In one embodiment, processor 402 initiates changes to information displayed on panel 404 (e.g. adjusts a displayed map, changes option screens) based on detection and location of the touch events. In other embodiments, processor 402 provides indication and location of the touch events to other systems (e.g. climate controller, motor controllers, communications devices-none shown) to initiate actions based on the touch event.

In other embodiments, system 400 may include other circuitry, perform other functions, or be arranged in other configurations, or combinations thereof. In one embodiment, transceivers 411-414 drive transmit signals on the longer set of electrodes between the row electrodes and the column electrodes. For example, in the illustrated embodiment, row electrodes 431-434 are each longer than any of column electrodes 426-429. In other embodiments, such as when the column electrodes are longer than the row electrodes, transceivers 411-414 may drive signals onto column electrodes 426-429, while transceivers 421-424 may sense current of row electrodes 431-434. In other embodiments, transceivers 411-414 and 421-424 can all transmit and receive simultaneously.

As illustrated in FIG. 4, each transmit signal (TXi) is provided to a corresponding row electrode of rows electrodes 431-434, in which "i" represents the row index. For example, TX1 is provided to the "row 1" electrode 431, TX2 to the "row 2" electrode 432, etc. Similarly, each receive signal (RXj) is sensed or received on a corresponding column electrode of column electrodes 426-429, in which "j" represents the column index. Referring to row 1 (row electrode 431) and column 1 (column electrode 426) as an example, TX1 is generated by modulating a carrier sine wave signal with a corresponding modulation signal of a set of orthogonal modulation signals. That is, each modulation signal within the set of orthogonal modulation signals is orthogonal to every other orthogonal signal of the set of orthogonal modulation signals. Note that carrier sine wave signal being modulated can be provided by processor 402 or can be generated within transmitter 411. The resulting transmit signal TX1 is driven onto electrode 431. Note that the resulting transmit signals TX1-TXN (also referred to as the modulated signals) which are driven onto the row electrodes are not all orthogonal with respect to each other. In one embodiment, none are orthogonal with each other.

The set of orthogonal modulation signals can either be orthogonal bit code sequences (represented as Bi(t)) that toggle between +1/−1 for a certain number of bits) or sine wave signals (represented as $\sin(2*\pi*Fi*t)$ having different (unique) frequencies. The carrier sine wave signal can therefore be modulated with the orthogonal codes (for the ORTHO-PHASE or ORTHO-FREQ modulation schemes) or the sine waves (for the SIN-SIN modulation scheme).

The ORTHO-PHASE modulation scheme can be generally expressed as:

$$TXi = \sin(2*\pi*Fc*t + dP*Bi(t))$$

In this expression, "i" is the row index of the signal, Fc is the frequency of the modulated signal (i.e. the carrier signal), dP is the phase modulation depth (i.e. phase jump) and Bi(t) is the orthogonal bit code sequence corresponding to the i-th row issued over time. The orthogonal bit code sequence repeats an integer number (K) of times over the frame period (Tframe). Therefore, assuming a bit code sequence is composed of L bits and that the bits are issued every bit period (Tbit), then K*L*Tbit=Tframe. Also, in one embodiment, Fc=Y*Fbit in which Y is an integer number. In one embodiment, a "Hadamard" code can be used to set the set of orthogonal codes, in which, at each step, there is the same amount of ones and zeros (or minus ones). By doing so, the resulting phase shift of the sum of received signals stays close to zero (i.e. within a predetermined range of zero) when there is no touch present.

The ORTHO-FREQ modulation scheme can be generally expressed as:

$$TXi = \sin((2*\pi*(Fc+Bi(t)*F\text{mod})*t)$$

In this expression, as with the previous expression, "i" is the row index of the signal, Fc is the frequency of the modulated signal (i.e. the carrier signal), and Bi(t) is the orthogonal code sequence corresponding to the i-th row issued over time. Fmod is the frequency modulation depth (i.e. frequency jump). As with the ORTHO-PHASE modulation scheme, the orthogonal bit code sequence repeats an integer number (K) of times over the frame period (Tframe). Therefore, assuming a bit code sequence is composed of L bits and that the bits are issued every bit period (Tbit), then K*L*Tbit=Tframe. Also, as with the ORTHO-PHASE modulation scheme, a "Hadamard" code can be used to set the set of orthogonal codes. In one embodiment of the ORTHO-FREQ scheme, Fc+Fmod=Y*Fbit and Fc−Fmod=Z*Fbit, in which Fbit is the bit frequency and each of Y and Z are integer numbers.

The SIN-SIN modulation scheme can be generally expressed as:

$$TXi = \sin(2*\pi*Fc*t+dP*\sin(2*\pi*Fi*t))$$

In this expression, as with the above expressions, "i" is the row index of the signal, Fc is the frequency of the modulated signal (i.e. the carrier signal), and dP is the phase modulation depth. In this expression, "sin(2*π*Fi*t)" corresponds to the modulation sine wave signal, in which Fi is the frequency of the modulation sine wave signal corresponding to the i-th row. That is, each modulation sine wave signal has a unique modulation frequency corresponding to a unique row electrode. In one embodiment, there is an integer number of sinewave modulation periods in a frame period. Assuming the sine wave modulation frequency is Fi and Fframe the frame frequency, then Fi=K*Fframe, in which K is an integer value (and may be different from the K value used above). For all of the above modulation schemes, an integer number of carrier periods are in a frame period, Fc=Y*Fframe, in which Y is an integer value (and may be different from the Y value used above).

For these modulation schemes, an approximation can be used. Whenever there is a touch event, the receive signal along the touched column is a sum of sinewaves having the same carrier central frequency Fc, but with different phase or frequency modulation. The extracted phase or frequency information from the receive signal is a linear combination of the modulation signals. In this manner, the orthogonal modulation signals are transmitted in the phase or frequency domain and their amplitudes after correlation in the phase or frequency domain represent the amount of touch.

In one embodiment, the i transmit signals driven onto the row electrodes of panel 404 can be expressed more specifically as:

$$TXi = Ai*\sin(2*\pi*Fc*t+dP*Bi(t)) \quad \text{(for ORTHO–PHASE)}$$
$$TXi = Ai*\sin(2*\pi*Fc*t+2*\pi*Bi(t)*F\text{mod}*t) \quad \text{(for ORTHO–FREQ)}$$
$$TXi = Ai*\sin(2*\pi*Fc*t+dP*\sin(2*\pi*Fi*t)) \quad \text{(for SIN–SIN)}$$

In the above expressions, Bi(t), dP, Fc, and Fmod are all as described with the general expressions, but Ai is explicitly included and refers to the amplitude of the transmit signals. It is the amplitude Ai that is affected by a touch event. Note that dP and Fmod (which may also be referred to as dF) are parameters which correspond to the modulation depth, and depict how much the carrier phase or frequency, respectively, is disturbed. Note also that dP can be smoothed for Electromagnetic Compatibility (EMC).

In one embodiment, the j receive signals from panel 404 can be expressed, in a first approximation, as follows. (Note that the panel transfer effect has been excluded for clarity as it is assumed similar or close to the effect for all signals involved in the RX composition.)

$$RXj = \text{sum}(Tij*Ai*\sin(2*\pi*Fc*t+dP*Bi(t))),$$
$$\text{for } i=1 \text{ to } N \text{ (for ORTHO–PHASE)}$$
$$RXj = \text{sum}(Tij*Ai*\sin(2*\pi*Fc*t+2*\pi*Bi(t)*F\text{mod}*t)),$$
$$\text{for } i=1 \text{ to } N \text{ (for ORTHO–FREQ)}$$
$$RXj = \text{sum}(Tij*Ai*\sin(2*\pi*Fc*t+dP*\sin(2*\pi*Fi*t)),$$
$$\text{for } i=1 \text{ to } N \text{ (for SIN–SIN)}$$

In the above RX expressions, Ai is the amplitude of the transmit signals, and Tij is the transfer coefficient from TXi to RXj. That is, Tij represents the coupling between row "i" and column "j" and affects the resulting amplitude of RXj (e.g. Tij*Ai).

However, once the carrier has been removed from the signal (i.e. once the RXi signal has been demodulated), the demodulated RX signals can be approximated as:

$$RXj \approx \text{sum}(Tij*Ai*dP*Bi(t))), \text{ for } i=1 \text{ to } N \text{ (for ORTHO–PHASE)}$$
$$RXj \approx \text{sum}(Tij*Ai*2*\pi*Bi(t)*F\text{mod}*t)),$$
$$\text{for } i=1 \text{ to } N \text{ (for ORTHO–FREQ)}$$
$$RXj \approx \text{sum}(Tij*Ai*dP*\sin(2*\pi*Fi*t)), \text{ for } i=1 \text{ to } N \text{ (for SIN–SIN)}$$

Further details of the demodulation of the RX signals are provided with the below equations. Note that in the equations which follow, "1i" refers to the imaginary number (square root of negative one), "2i" refers to twice the imaginary number, and "x" refers to convolution (e.g. "f x g" refers to the convolution of f, g). Also, the "dot" and the "asterisk" both mean multiply. Using a common expression which is valid for all the modulation schemes, the transmit signal driven on each electrode can be expressed as:

$$TX_i(t) = A_i \sin(2.\pi.F_c.t + m_i(t))$$

$$= A_i/2i \cdot (\exp(1i.(2.\pi.F_c.t + m_i(t))) - \exp(-1i.(2.\pi.F_c.t + m_i(t))))$$

In the above expression:

$$m_i(t) = dP.b_i(t) \; (\text{for } ortho\text{-phase})$$

$$m_i(t) = 2\pi.dF.b_i(t).t \; (\text{for } ortho\text{-}freq)$$

$$m_i(t) = \sin(2.\pi.F_i.t) \; (\text{for } sin\text{-}sin)$$

$$b_i(t) \in \{+1, -1\}$$

The panel transfer Hij depicts either mutual capacitance or self capacitance effects. The receive signal (RX) received by buffer Bij can be expressed as follows:

$$B_{ij}(t) = \sum_i H_{ij}(t) \times TX_i(t)$$

Demodulating this receive signal to remove the carrier includes the following three steps: 1. mixing with a complex analytical signal to get in-phase and quadrature signals, 2. filtering of the harmonics mixing image located at 2*Fc, and 3. extraction of the angle, including unwrapping. The demodulated signal at mixer outputs Mi can be expressed in analytical (i.e. complex) form as follows:

$$M_i(t) = B_{ij}(t) \cdot \exp(-1i.2.\pi.F_c.t)$$

$$= \sum_i (H_{ij}(t) \cdot \exp(-1i.2.\pi.F_c.t)) \times (TX_i(t) \cdot \exp(-1i.2.\pi.F_c.t))$$

This can be expanded as follows:

$$M_i(t) = \sum_i (H_{ij}(t) \cdot \exp(-1i.2.\pi.F_c.t)) \times (A_i/2i.\exp(1i.m_i(t))) -$$

$$\sum_i (H_{ij}(t) \cdot \exp(-1i.2.\pi.F_c.t)) \times (A_i/2i.\exp(-1i.(2.\pi.2F_c.t + m_i(t))))$$

The signal after filtering Di can be expressed in analytical form as follows, in which LPF refers to low pass filtering:

$$D_i(t) = \sum_i T_{ij}(t) \times A_i/2i.\exp(1i.m_i(t))$$

$$T_{ij}(t) = (H_{ij}(t) \cdot \exp(-1i.2.\pi.F_c.t)) \times LPF(t)$$

The demodulated receive signal can therefore be expressed as follows:

$$RXj = \text{unwrap}(a \tan 2(\text{real}(Di(t)), \text{imag}(Di(t))))$$

The exponential term exp(1i.mi(t)) for each modulation scheme can be expressed as follows. First, for the ORTHO-PHASE modulation scheme:

$$\exp(1i.m_i(t)) = \frac{1 + b_i(t)}{2} \exp(1i.dP) + \frac{1 - b_i(t)}{2} \exp(-1i.dP)$$

$$D_i(t) = \exp(1i.dP).\sum_i T_{ij}(t) \times A_i/2i.\frac{1 + b_i(t)}{2} +$$

$$\exp(-1i.dP).\sum_i T_{ij}(t) \times A_i/2i.\frac{1 - b_i(t)}{2}$$

This term can be interpreted as a weighted sum of all transmitted signals. For clarity of explanation, it is assumed, in the following case, that Tij is constant over time. The linear combination of modulated signals can therefore be seen with the following expression:

$$D_i(t) =$$

$$\exp(1i.dP).\sum_i T_{ij}.A_i/2i.\frac{1 + b_i(t)}{2} + \exp(-1i.dP).\sum_i T_{ij}.A_i/2i.\frac{1 - b_i(t)}{2}$$

Second, referring again to the exponential term exp(1i.mi (t)), for the ORTHO-FREQ modulation scheme:

$$\exp(1i.m_i(t)) = \frac{1 + b_i(t)}{2} \exp(1i.2\pi.dF.t) + \frac{-1 + b_i(t)}{2} \exp(-1i.2\pi.dF.t)$$

$$D_i(t) = \exp(1i.2\pi.dF.t).\sum_i T_{ij}(t) \times A_i/2i.\frac{1 + b_i(t)}{2} +$$

$$\exp(-1i.2\pi.dF.t).\sum_i T_{ij}(t) \times A_i/2i.\frac{-1 + b_i(t)}{2}$$

As with the ORTHO-PHASE scheme, if it is assumed that Tij is time constant, the expression can be simplified as shown above, which illustrates the linear combination of modulated signals.

Third, referring again to the exponential term exp(1i.mi (t)), for the SIN-SIN modulation scheme:

$$\exp(1i.m_i(t)) = \exp(1i.\sin(2.\pi.F_i.t))$$

$$D_i(t) = \sum_i T_{ij}(t) \times A_i/2i.\exp(1i.\sin(2.\pi.F_i.t))$$

$$= \sum_i T_{ij}(t) \times A_i/2i.(1 + 1i.\sin(2.\pi.F_i.t) + neg(t))$$

In the above expression, neg(t) is negligible as it is produced over band term and therefore the linear combination of modulation signals appear.

FIGS. 5-8 illustrate block diagrams of system 400, in accordance with various embodiments, to implement the various modulation schemes described above. Note that like reference numerals within FIGS. 4-8 correspond to like elements.

Figure 5:
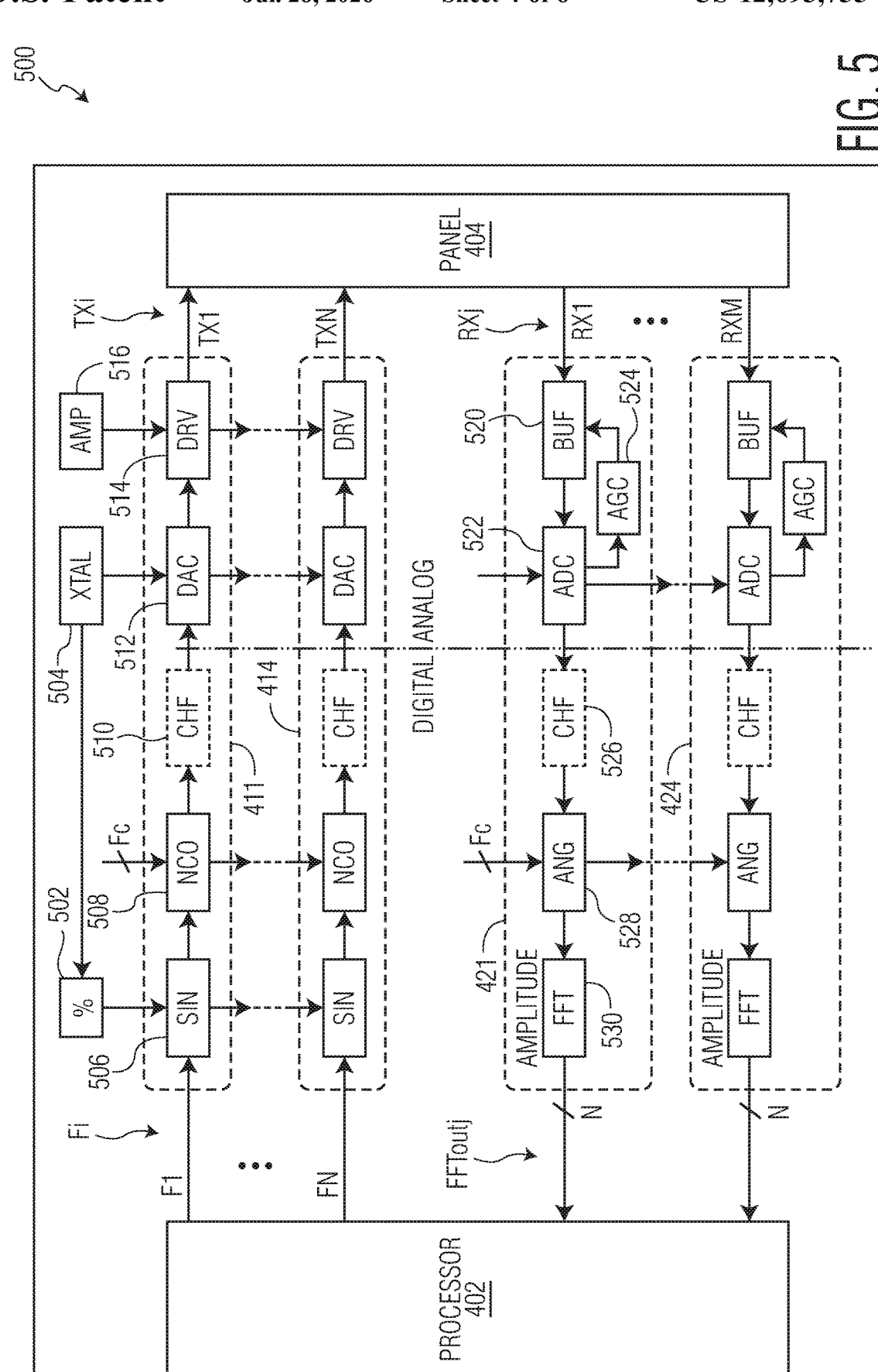
FIG. 5 illustrates, in block diagram form, the touch panel system of FIG. 4 in the case of a SIN-SIN modulation scheme, in accordance with one embodiment of the present invention.

FIG. 5 illustrates, in block diagram form, system 400 in which the transmitters and receivers of the transceivers operate in accordance with the SIN-SIN modulation scheme, in accordance with one embodiment of the present invention. Referring to FIG. 5, processor 402 provides Fi (the frequency of the modulation signal) corresponding to each row to each of transceivers 411-414 (also referred to as transmitters 411-414, respectively). For example, F1 is provided to transceiver 411 and FN to transceiver 414. The instantiation of transceiver 411 of FIG. 5 will be described in further detail as an example, but the instantiations of other transceivers of transceivers 411-414 in FIG. 5 include analogous elements and operate analogously to the illustrated instantiation of transceiver 411. The illustrated embodiment of system 400 also includes a crystal (XTAL) 504 and a frequency divider 502 (labeled as %). (Note that in alternate embodiments, XTAL 504 can be implemented differently, such as with one or more oscillators, phase locked loops (PLLs), etc.)

Transceiver 411 of FIG. 5 includes sine wave generator (SIN) 506, a numerically controlled oscillator (NCO) 508, a channel filter (CHF) 510 (which, in alternate embodiments, is not present), a digital to analog converter (DAC) 512, and a driver (DRV) 514. (Note that these elements correspond to the transmitter portion of transceiver 411.) F1 is provided by processor 402 to SIN 506 which generates a sine wave whose frequency is F1. Note that, in one embodiment, each of the frequencies F1-FN are multiples of 1/Tframe. Note also that all the sin waves generated by the sine wave generators (SINs) in transceivers 411-414 are each unique, i.e. each orthogonal to all other sine waves. The sin waves generated by the SINs may be referred to as the set of modulation signals. SIN also receives the output of frequency divider 502, which is coupled to receive an oscillating output from XTAL 504. XTAL 504 is a crystal oscillator which runs at a higher frequency which can be used to clock over-sample portions of circuitry within the transmitters and receivers of the transceivers (such as a sigma-delta analog to digital converter (ADC)). Frequency divider 502 provides a divided clock signal generated from XTAL 504 for digital circuitry which runs at a lower rate (such as providing the modulation signals).

The generated sine wave is provided to NCO 508, which also receives Fc (the frequency of the common carrier signal, i.e. common sin wave signal). NCO 508 receives Fc, and according to Fc and the modulation sine wave, generates a digital signal which represents the modulated sinewave. The output of NCO 508 is provided to CHF 510 to filter the received signal for the appropriate channel (in the case of multiple carriers) and remove unwanted harmonics of the modulated signal for EMC compatibility. In the case of a single channel, though, CHF 510 is not present and the output of NCO 508 is provided directly to DAC 512, which also receives an oscillating output from XTAL 504.

DAC 512 converts the received digital signal from NCO 508 (or the filtered digital signal from CHF 510, if present) and, using the oscillating output from XTAL 504, converts the received digital signal to the analog domain. DAC 512 can be implemented as any known type of DAC, such as a Nyquist, Sigma-delta, etc. For example, in the case that DAC 512 includes an over-sampling architecture, DAC 512 may include an up-sampler, sigma-delta modulator, and analog decimation filter, as known in the art. DAC 512 can also embed any linearization technique and any jitter desensitization technique. The analog resulting analog signal from DAC 512 is provided DRV 514 which drives the resulting transmit signal TX1 in the voltage domain onto corresponding row electrode 431 of panel 404. Control AMP 516 sets the drive strength of drivers in which the output level is applied to the electrodes. Note that the circuitry prior to DAC 512 in each transceiver corresponding to digital circuitry, while the circuitry to the right of the digital circuitry, starting with DAC 512, in each transceiver corresponds to analog circuitry.

Transceivers 421-424 of FIG. 5 (also referred to as receivers 421-424, respectively) sample the receive signals RX from the column electrodes of panel 404 (RX1-RXM), in which each transceiver senses a corresponding receive signal RXj and provides a corresponding correlation signal FFToutj to processor 402. In the illustrated embodiment, FFToutj provides N outputs, each corresponding to an amplitude for Fi. In this manner, each of the N outputs of FFTj is representative of Tij (as appears in the RXi equations provided above for SIN-SIN, in which the resulting amplitude of the sensed RXi corresponds to "Tij*Ai"). For example, RX1 is sensed by transceiver 421 and RXM by transceiver 424. Transceiver 421 provides FFTout1 which includes N amplitudes, one for each of the N rows and representative of T11 through TN1 (i.e. Tij in which i=1 to N and j=1). The instantiation of transceiver 421 of FIG. 5 will be described in further detail as an example, but the instantiations for the other transceivers of transceivers 421-424 includes analogous elements and operates analogously to the illustrated instantiation of transceiver 421.

Transceiver 421 of FIG. 5 includes an adaptive sense buffer (BUF) 520, an automatic gain controller (AGC) 524, an analog to digital converter (ADC) 522, a CHF 526, a phase extractor (ANG) 528, and a correlator (COR) 530 which is implemented as a Fast Fourier Transform (FFT), and may therefore also be referred to as FFT 530. (Note that these elements correspond to the receiver portion of transceiver 421.) As with CHF 510, CHF 526 is optional, depending on whether or not multiple channels are used.

BUF 520 is coupled to receive RX1 from column electrode 426 of panel 404. Any transceiver of any electrode of panel 404 can use both transmit and receive functionalities. If the transmitter drives its electrode in the voltage domain, the buffer attached to that electrode receives in the current domain, and if the transmitter drives its electrode in the current domain, the buffer attached to that electrode receives in the voltage domain. Regardless, though, BUF 520 receives an image of the signal of the transmitter (if active) corresponding to its electrode plus all coupling current captured by the row electrode. BUF 520 can therefore provide its output in either the current domain or the voltage domain, in which AGC 524 can provide gain control prior to providing the output of BUF 520 to ADC 522. BUF 520 can be implemented in any way as known in the art to sample the current or voltage on the column electrode. ADC 522 receives an analog input from BUF 520 and provides a digital output to ANG 528 (filtered by CHF 528, if present). ADC 522 can be any type of ADC, such as a Nyquist or Over-sampling type. In the over-sampling case, ADC 522 includes a decimation filter.

ANG 528 extracts the phase of the incoming signal and unwraps it. It may include some filtering as well. ANG 528 can be implemented by different embodiments of phase extractor circuitry. For example, in one embodiment, the input signal is first delayed by Tbit/4 (i.e. Tcarrier/4) to produce a quadrature signal and then both are used to extract the phase information. In another embodiment, a mixer clocked by Fc (i.e. Fcarrier) followed by a low pass filter can be used. The extracted phase information is then provided to FFT 530 which performs a Fast Fourier Transform using the received phase information and outputs a corresponding amplitude (representative of Tij) for each of the N rows (for each of the corresponding F1-FN frequencies). This amplitude information is provided to processor 402 which uses this information, representative of the coupling between rows 1-N and column j, to detect a touch event based on changes in this amplitude information. The amplitude information represents the correlation between the rows 1-N and column j, and may therefore be referred as correlation values or correlation signals (and the FFTs as correlators).

Figure 6:
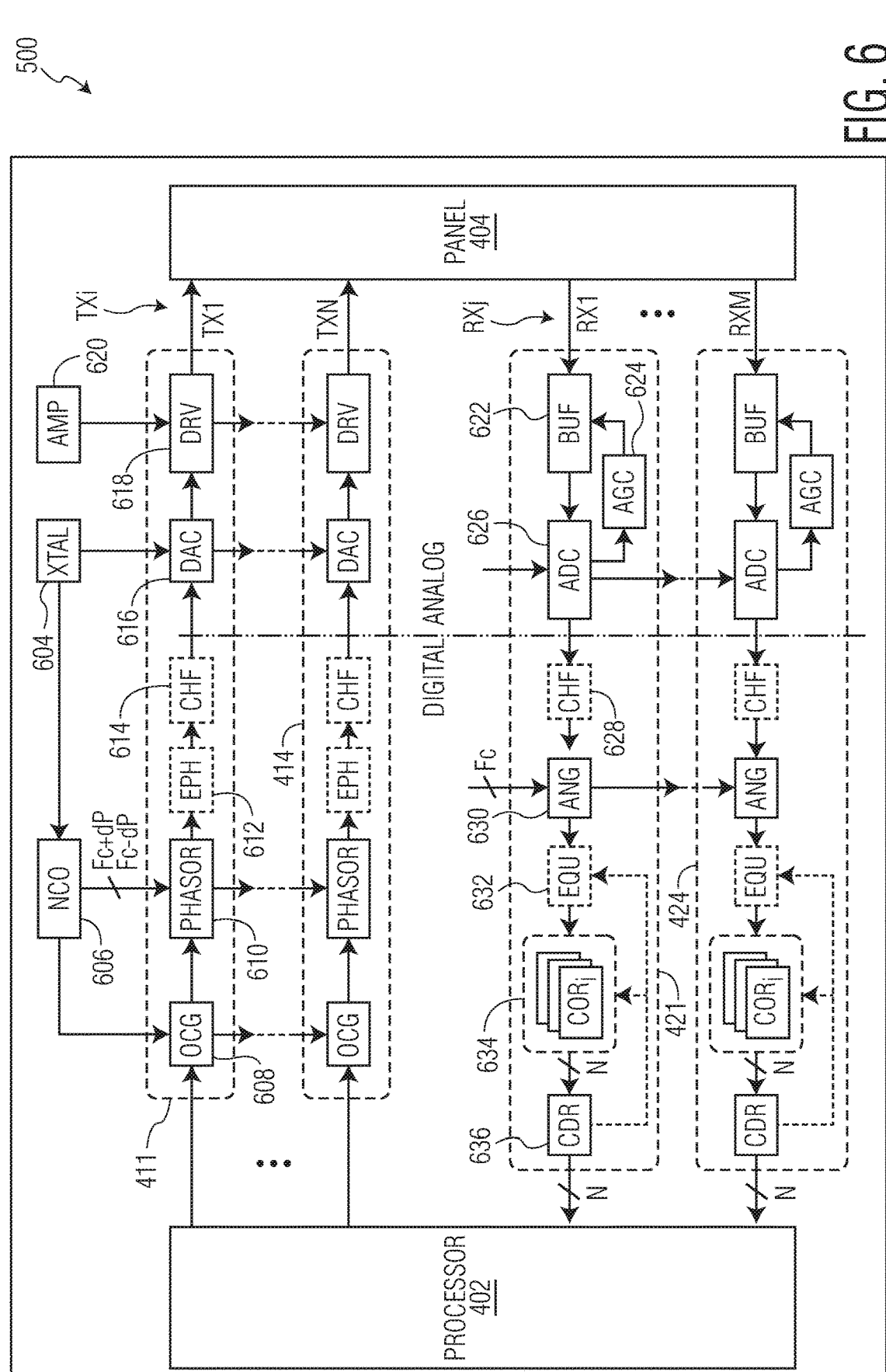
FIGS. 6 and 7 illustrate, in block diagram form, the touch panel system of FIG. 4 in the case of an ORTHO-PHASE modulation scheme, in accordance with one embodiment of the present invention.
Figure 7:
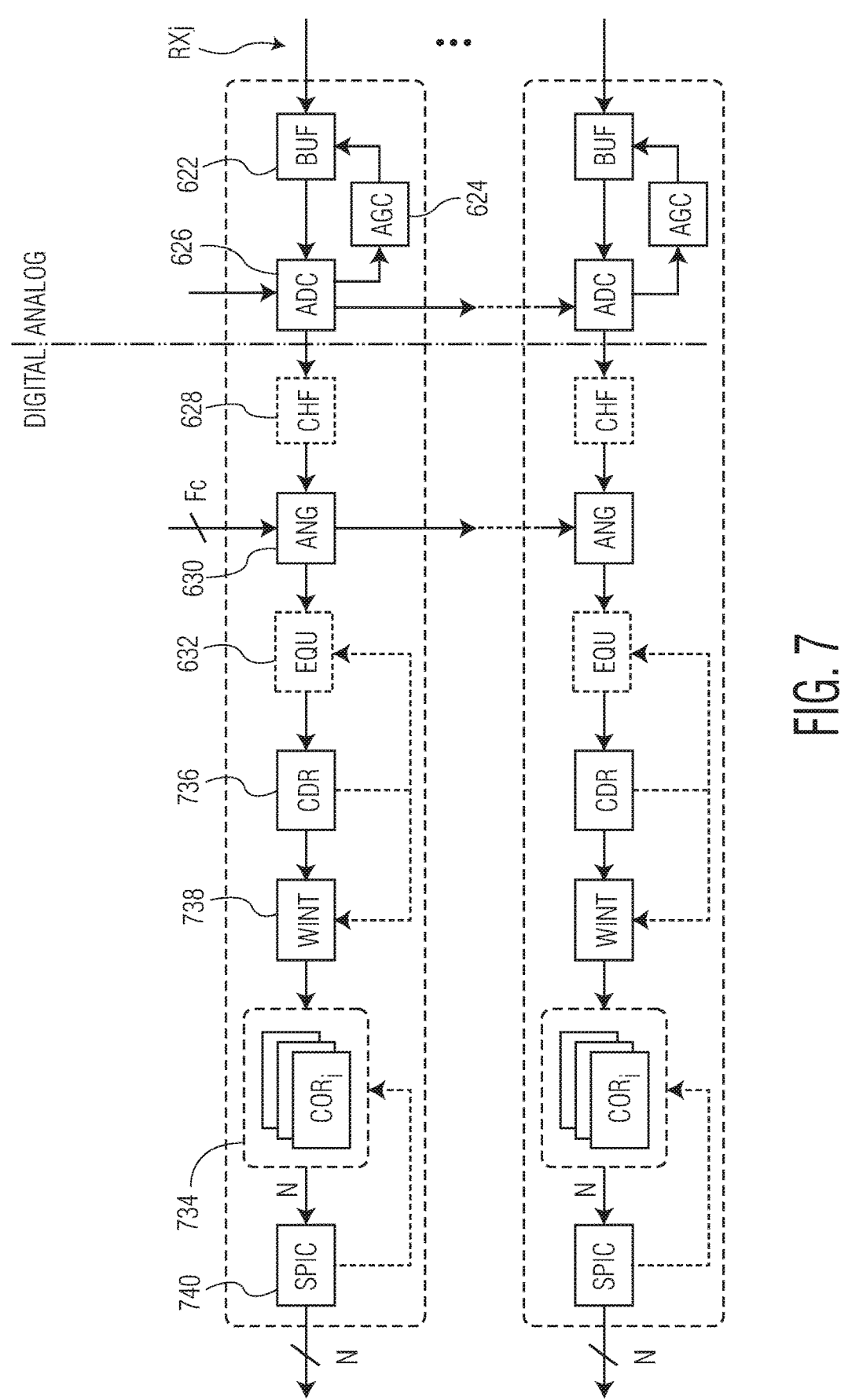

FIGS. 6 and 7 illustrate, in block diagram form, embodiments of system 400 in which the transmitters and receivers of the transceivers operate in accordance with the ORTHO-PHASE modulation scheme. Referring first to FIG. 6, processor 402 provides corresponding information for each row to the Orthogonal Chip Generator (OCG) of transceivers 411-414. For example, OCG 608 receives corresponding information for row 1, such as, for example, an indication of which orthogonal sequence is allocated to transceiver 411. The instantiation of transceiver 411 of FIG. 6 will be described in further detail as an example, but the instantiations for the other transceivers of transceivers 411-414 of FIG. 6 include analogous elements and operate analogously to the illustrated instantiation of transceiver 411. The illustrated embodiment of system 400 in FIG. 6 also includes a crystal (XTAL) 604, which can be shared among the transceivers and the receivers, as needed.

Transceiver 411 of FIG. 6 includes OCG 608, a PHASOR 610, a pre-emphasis stage (EPH) 612 (which, in alternate embodiments, is not present, a CHF 614 (which, in alternate embodiments, is not present), a DAC 616, and a DRV 618. (Note that these elements correspond to the transmitter portion of transceiver 411 of FIG. 6.) OCG 608 generates orthogonal chips (bit sequences) corresponding to the i-th row having a predefined length of bits (e.g. Lbit). The length of the chip depends on the central frequency and the refresh rate. For example, L=Tframe/Tbit in which Tframe is the frame rate and Tbit is an integer number of the central carrier period. In each bit sequence, there should be the same amount of zeros (0s) and ones (1s) so that the accumulated phase drift over a complete frame period stays null. Also, in one embodiment, in a same bit time slot, the same amount of 0s and 1s is used in all i codes. Also, in one embodiment, once the Lbits have been issued, a new round restarts form the first one.

In one embodiment, a Cil code matrix is defined (in which l=chip length and i for the corresponding row). In this matrix, orthogonality exists between all codes ([Cil]*[Cil]'=diagonal matrix). The matrix is fully balanced in that it has the same amount of +1 as −1, such that sum(Cil for l=1 to Lbit)=0. In one embodiment, the matrix is also fully balanced in the other dimension such that sum(Cil for l=1 to N)=0.

NCO 606 (which can be shared by all transceivers) receives Fc and generates a digital representation of a sinusoidal waveform and trig signals to OCG 608. NCO 606 provides sine waves for (Fc+dP) as well as for (Fc−dP) to PHASOR 610. PHASOR 610 selects the sine wave based on the modulation bit received via the bit sequence from OCG 608. That is, it selects which of the predefined carriers sin(2*π*Fc*t+dP) or sin(2*π*Fc*t−dP) to output. Therefore, each modulation bit of the bit code from OCG 608 indicates how to modify a phase of the carrier sine wave signal. These carriers having different phases are then provided by NCO 606. PHASOR 610 also can embed some filtering to either smooth or enhance the transition or reduce inter-symbol modulation. If present, the output of PHASOR 610 is provided to EPH 612 whose output may be filtered by CHF 614, if needed. Otherwise, the output of PHASOR 610 is provided directly as the digital input of DAC 616. The analog output of DAC 616 is provided to DRV 411 which then drives TX1 onto row electrode 431 of panel 404. Note that the descriptions for DAC 512, DRV 5114, and AMP 516 provided also apply to DAC 616, DRV 618, and AMP 620.

Transceivers 421-424 of FIG. 6 sample the receive signals RX from the column electrodes of panel 404 (RX1-RXM), in which each transceiver senses a corresponding receive signal RXj and provides a corresponding set of N correlation signals to processor 402. For each RXj, the N correlation signals provide the correlation of each of the N row electrodes to the jth column electrode. For example, RX1 is sensed by the receiver of transceiver 421 and RXM by the receiver of transceiver 424. Transceiver 421 provides N correlation signals, one corresponding to the correlation of each of the N row electrodes to column electrode 426. The instantiation of transceiver 421 of FIG. 6 will be described in further detail as an example, but the instantiations for the other transceivers of transceivers 421-424 of FIG. 6 include analogous elements and operate analogously to the illustrated instantiation of transceiver 421.

Transceiver 421 of FIG. 6 includes a BUF 622, an AGC 624, an ADC 626, a CHF 628, an ANG 630, an equalizer (EQU 632), and a set of N correlators (CORi) 634 (including one for each of rows 1-N, i.e. for i=1 to N), and an clock recovery unit (CDR) 636. (Note that these elements correspond to the receiver portion of transceiver 421 of FIG. 6.) As with CHF 614, CHF 628 is optional, depending on whether or not multiple channels are used. EQU 632 may also not be present.

BUF 620 is coupled to receive RX1 from column electrode 426 of panel 404. AGC 624 can provide gain control to the output of BUF 622 prior to providing the output to ADC 626. ADC 626 receives an analog input from BUF 622 and provides a digital output to ANG 630 (filtered by CHF 628, if present). The descriptions provided above for BUF 520, ADC 522, AGC 524, and ANG 528 apply analogously to BUF 622, ADC 626, AGC 624, and ANG 630.

ANG 630 extracts the phase and provides the extracted phase to CORi 634. If EQU is present, equalization may first be applied to the output of ANG 630. CORi 634 performs a correlation between each of TX1-TXN and RX1, and outputs the N correlation signals (i.e. correlation values). That is, CORi 634 correlates RXj with all possible orthogonal sequences corresponding to the N rows (to the N TX signals). In one embodiment, CORi 634 includes N+1 correlators in which for the additional correlator, all coefficients are set to unity. The set of N correlators analyze the sum of all signals to tell if any touch happens (in the jth column). In one embodiment, the correlation values may relate to amplitude information for each correlation.

The correlators can either run at the Tbit rate or at the over-sampled ADC rate. At any particular time, their outputs represent the amount of touch attached to any TX signal. FIG. 6 corresponds to an embodiment in which the correlators run at the over-sampled ADC rate. In this embodiment, the correlators continuously integrate (excluding the smooth part of a bit period) over the complete bit sequence.

CDR 636 applies clock recovery which depends on the correlator rate. Therefore, in the embodiment of FIG. 6 in which the correlators run at the over-sampled ADC rate, the CDR analyzes the streams output from all the N correlators, looking at pic response (which occurs once per time frame) and samples at that time, all correlator outputs (which, at that time, reach a valid response). CDR 636 can feed back control to the correlators and EQU 632. Processor 404 which receives the outputs from CDR 636 uses the correlation information, representative of the coupling between rows 1-N and column j, to detect a touch event based on changes in the amount of correlation.

FIG. 7 illustrates an alternate embodiment for transceiver 421 (e.g. for the receiver portion of transceiver 421) of FIG. 6 in which, instead, the correlators run at the bit rate. In this embodiment, the output of ANG 630 (equalized by EQU 632, if present) is provided to a CDR 736. In one embodiment, CDR 736 analyzes the ADC output stream and can also control EQU 632. CDR 736 also drives the bit integration window (WINT) 738. WINT 738 integrates the output of CDR 736 over the Tbit period, excluding the smooth portion. CDR 736 can indicate when to start, stop, or down-sample within the Tbit period.

WINT 738 provides its output to a set of N correlators (CORi) 734, in which the descriptions provided for CORi 634 above apply analogously to CORi 734. The N correlation signals output by CORi 634 are provided to a unit which searches for correlator peak responses (SPIC) 740. CORi 734 output at the bit rate, and SPIC 740 analyzes the output streams from CORi 734, looking at the pic response and samples at that time, all correlator outputs. As in FIG. 6, in the embodiment of FIG. 7, processor 404 which receives the correlation outputs from CORi 734, through SPIC 740, and uses the correlation information, representative of the coupling between rows 1-N and column j, to detect a touch event based on changes in the amount of correlation. As in FIG. 6, the correlation values may relate to amplitude information for each correlation.

Figure 8:
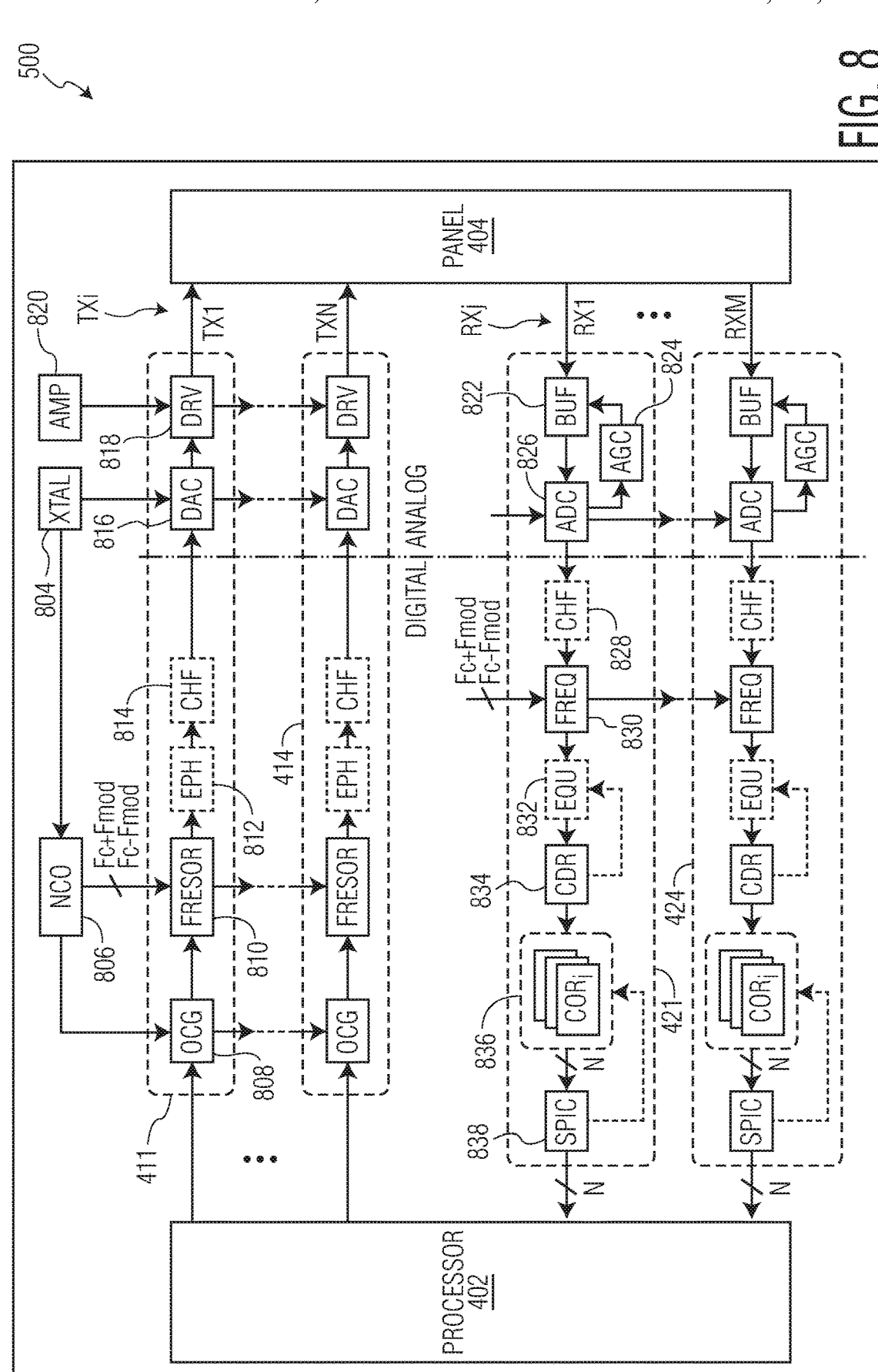
FIG. 8 illustrates, in block diagram form, the touch panel system of FIG. 4 in the case of an ORTHO-FREQ modulation scheme, in accordance with one embodiment of the present invention.

FIG. 8 illustrates, in block diagram form, an embodiment of system 400 in which the transmitters and transceivers of the transceivers operate in accordance with the ORTHO-FREQ modulation scheme. Referring to FIG. 8, the descriptions provided above with respect to OCG 608, EPH 612, CHF 614, DAC 616, DRV 618, AMP 620, NCO 606, and XTAL 620 apply analogously to OCG 808, EPH 812, CHF 814, DAC 816, DRV 818, AMP 820, NCO 806, and XTAL 820. (Note that these elements correspond to the transmitter portion of transceiver 411 of FIG. 8.) Instead of NCO 806 providing sine waves for (Fc+dP) and (Fc−dP) as done by NCO 606, NCO 806 instead provides sine waves for (Fc+Fmod) and (Fc−Fmod). Also, instead of PHASOR 610, transceiver 411 of FIG. 8 includes FRESOR 810. FRESOR 810, according to the modulation bit received via the bit sequence from OCG 808, selects the correct sine wave (according to Fc+Fmod or Fc−Fmod). Therefore, each modulation bit of the bit code from OCG 808 indicates how to modify carrier frequency of the carrier sine wave signal. Also, the instantiations for the other transceivers of transceivers 411-414 of FIG. 8 include analogous elements and operate analogously to the illustrated instantiation of transceiver 411 of FIG. 8.

Transceivers 421-424 of FIG. 8 sample the receive signals RX from the column electrodes of panel 404 (RX1-RXM), in which each receiver senses a corresponding receive signal RXj and provides a corresponding set of N correlation signals to processor 402. Referring to FIG. 8, the descriptions provided above with respect to BUF 622, ADC 626, AGC 624, CHF 628, EQU 632, CDR 736, CORi 634, and SPIC 740 apply analogously to BUF 822, ADC 826, AGC 824, CHF 828, EQU 832, CDR 834, CORi 836, and SPIC 838. (Note that these elements correspond to the receiver portion of transceiver 421 of FIG. 8.) However, instead of ANG 630, receiver 421 of FIG. 8 includes FREQ 830 which, rather than extracting the phase, extracts the amount of amplitude for each frequency (Fc+Fmod, Fc−Fmod). Therefore, the frequency modulation is extracted by FREQ 830, in which CDR 834 indicates the best time to sample the signal and EQU 832 is an equalizer which helps pre-condition the signal for improved performance, quality, and robustness. The instantiation of the other transceivers of transceivers 421-424 of FIG. 8 include analogous elements and operate analogously to the illustrated instantiation of transceiver 421.

Processor 404 which receives the correlation outputs from CORi 836, through SPIC 838, and uses the correlation information, representative of the coupling between rows 1-N and column j, to detect a touch event based on changes in the amount of correlation. As in FIGS. 6 and 7, the correlation values may relate to amplitude information for each correlation.

Note that in embodiments utilizing both mutual and self detection, two or more orthogonal modulation signals can be summed to modulate the carrier of a transmitter within a transceiver (e.g. transceivers 411-414). For example, the set of orthogonal modulation signals can include an extra modulation signal, referred to as the self modulation signal, in which, for each row, this signal can be used, in addition to the orthogonal modulation signal corresponding to the row, to generate the transmit signal. Either these modulation signals are summed and then passed on to the modulation stage within the transmitter portion, or they are generated separately and summed at the buffer input of the transmitter portion. In the case of self detection, it is preferable to generate it once for all transceivers and add it at the input of each transceiver buffer. Note that the self modulation signal can also be used by the transmit portion of each transceiver (e.g. transceivers 421-424) to generate transmit signals for each column as well as for each row, such that the self detection method can be utilized on all rows and columns. This configuration, in which the self modulation signal is used in each transceiver of system 400, enables touch detection by sensing both columns and rows involving parasitic capacitance (Cpr and Cpc) changes. This enables coarse detection of a touch event (of any touch in a row or in a column), while the set of orthogonal modulation signals for the orthogonal modulation schemes described above (e.g. SIN-SIN, ORTHO-PHASE, ORTHO-FREQ) involving mutual capacitance (Cm) changes can be used for determining fine location of the touch event.

Figure 9:
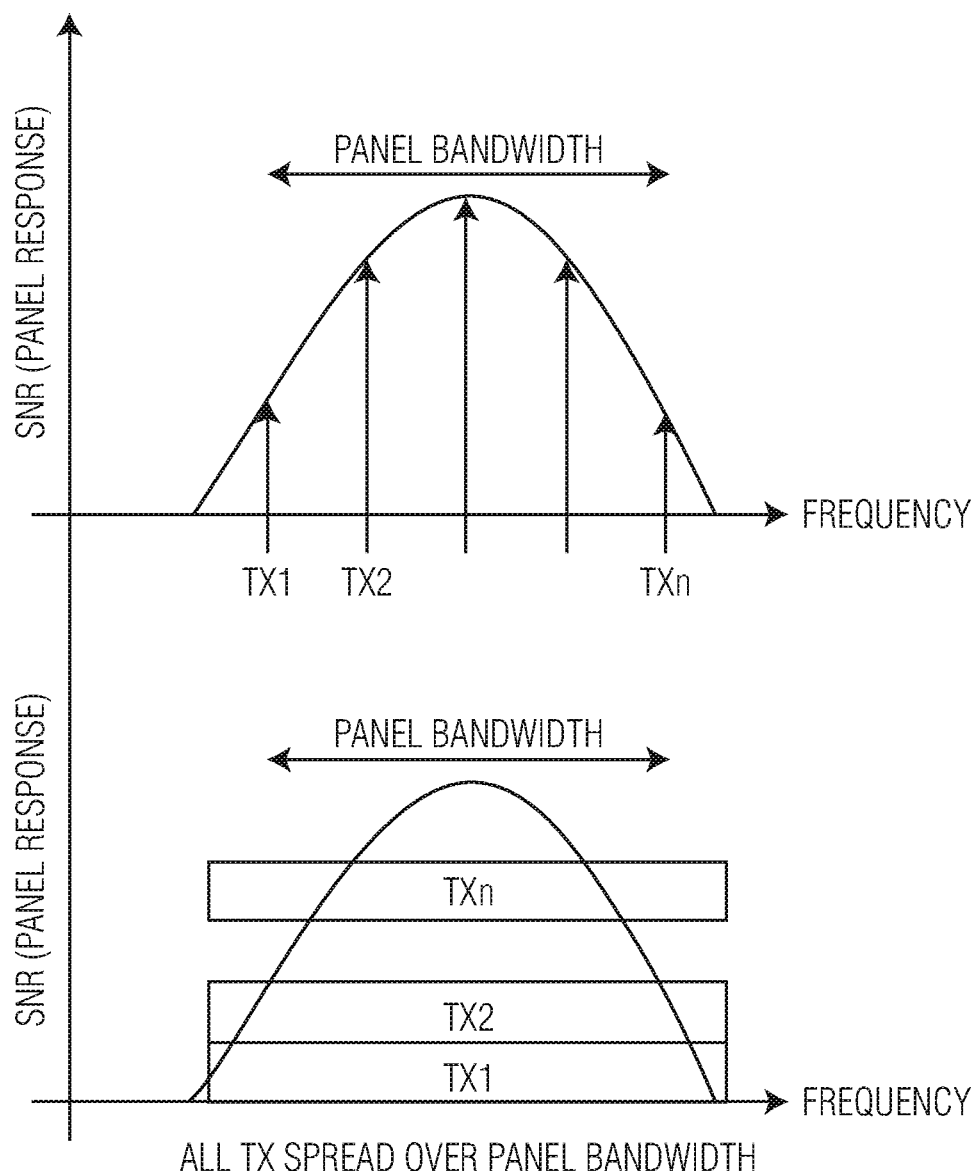
FIG. 9 illustrates a diagram comparing the frequency bandwidths based on using different types transmit signals.

As seen in FIG. 9, currently available touch screen systems, which drive a set of orthogonal transmit signals, TX1-TXn, onto the electrodes of the longer dimension of a touch panel, the frequency bandwidth of the panel results in undesirable attenuation of the transmit signals outside the center of the bandwidth. For example, the signals located at the panel band boundaries experience a very poor Signal to Noise Ratio (SNR) as compared to those located in the middle panel band. This is an increasing problem as the dimensions of the panels continue to scale even longer. However, by using instead a set of orthogonal modulation signals to generate transmit signals which are driven onto the electrodes of the longer dimension of a touch panel, the driven transmit signals are not all orthogonal to each other, but do span the entire panel bandwidth and thus occupy the same bandwidth as each other. In this manner, all the signals are altered in the same way. This reduces the effects of attenuation of the signals along the long electrodes, resulting in a more constant SNR across the panel, and resulting in improved detection of touch events.

Therefore, by now it can be appreciated how a touch event can be detected by driving transmit signals onto a first plurality of electrodes (e.g. row electrodes) of a touch panel and sensing receive signals on a second plurality of electrodes (e.g. column electrodes) of the touch panel in which a set of orthogonal modulation signals is used to modulate a common carrier signal to generate the transmit signals. However, although the set of orthogonal modulation signals are all orthogonal to each other, the resulting transmit signals which are driven onto the first plurality of electrodes are not all orthogonal. The set of orthogonal modulation signals can be a set of orthogonal sine waves, each having a unique frequency, or alternatively, can be a set of orthogonal bit codes. In the case of the orthogonal sine waves used as the modulation signals, a SIN-SIN modulation scheme can be used, and in the case of the orthogonal bit codes, either a phase or frequency modulation scheme can be used. Regardless of the which modulation scheme is used, however, the resulting set of transmit signals span over the entire panel bandwidth, allowing for improved touch detection. Receivers demodulate the sensed receive signals and, for each receive signal, correlate each of the transmit modulation signals with the receive demodulated signal, in which the changes in the resulting correlations indicate occurrence of a touch event.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the transmitters may drive the transmit signals onto the column electrodes and the receives sense the receive signals on the row electrodes. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

A touch panel includes a first plurality of electrodes and a second plurality of electrodes. A plurality of transmitters generate a plurality of transmit signals by modulating a common sine wave signal with a set of orthogonal modulation signals, and drive each transmit signal onto a corresponding electrode of the first plurality of electrodes. Each transmit signal is generated by modulating the common sine wave signal with a unique orthogonal modulation signal of the set of orthogonal modulation signals. At least two of the plurality of transmit signals are not orthogonal. Each receiver of a plurality of receivers senses a receive signal on a corresponding electrode of the second plurality of electrodes and generates a set of correlation signals by correlating the receive signal with each transmit signal of the plurality of transmit signals. The sets of correlation signals are used to detect a touch event on the touch panel.

The following are various embodiments of the present invention.

In one embodiment, a touch panel system includes a touch panel including a first plurality of electrodes and a second plurality of electrodes, wherein the first plurality of electrodes and the second plurality of electrodes define a plurality of crosspoints; a plurality of transmitters configured to: generate a plurality of transmit signals by modulating a common sine wave signal with a set of orthogonal modulation signals, each transmit signal generated by modulating the common sine wave signal with a unique orthogonal modulation signal of the set of orthogonal modulation signals, and drive each transmit signal onto a corresponding electrode of the first plurality of electrodes, wherein at least two of the plurality of transmit signals are not orthogonal to each other; a plurality of receivers, each receiver configured to sense a receive signal on a corresponding electrode of the second plurality of electrodes and generating a set of correlation signals by correlating the receive signal with each transmit signal of the plurality of transmit signals; and a processor configured to process the sets of correlation signals from the plurality of receivers to detect a touch event on the touch panel. In one aspect, each correlation signal of the sets of correlation signals indicates an amount of touch of the touch event. In a further aspect, each correlation signal of the sets of correlation signals provides corresponding amplitude information which is indicative of the amount of touch of the touch event. In another aspect, none of the plurality of transmit signals are orthogonal to each other. In another aspect, the set of orthogonal modulation signals further includes an extra modulation signal for use in self modulation, wherein each transmit signal is generated by modulating the common sine wave signal using both the unique orthogonal modulation signal and the extra modulation signal of the set of orthogonal modulation signals. In another aspect, the first plurality of electrodes and the second plurality of electrodes are arranged in a grid, wherein the first plurality of electrodes are not coplanar with the second plurality of electrodes, and wherein the first plurality of electrodes are perpendicular to the second plurality of electrodes, and an electrode length of each of the first plurality of electrodes is longer than an electrode length of each electrode of the second plurality of electrodes. In a further aspect, the first plurality of electrodes are located along rows of the grid, and the second plurality of electrodes are located along columns of the grid. In another aspect, the common sine wave signal modulated to generate each transmit signal of the plurality of transmit signals share a common central frequency. In a further aspect, the set of orthogonal modulation signals includes a set of orthogonal sine waves, each orthogonal sine wave having a unique frequency from other orthogonal sine waves of the set of orthogonal sine waves. In yet a further aspect, each receiver is configured to generate the set of correlation signals by performing a Fast Fourier Transform (FFT) of the receive signal corresponding to each unique frequency of the set of orthogonal sine waves. In yet an even further aspect, the set of correlation signals indicates an amount of coupling between the receive signal and each transmit signal of the plurality of transmit signals. In another further aspect, the set of orthogonal modulation signals include a set of orthogonal bit codes. In yet a further aspect, generating each transmit signal by modulating the common sine wave signal with a unique orthogonal modulation signal of the set of orthogonal modulation signals is performed by generating each transmit signal by modulating the common sine wave signal with a corresponding bit code of the set of orthogonal bit codes, wherein each bit of the corresponding bit code indicates how to modify a phase of the common sine wave signal. In another further aspect, generating each transmit signal by modulating the common sine wave signal with a unique orthogonal modulation signal of the set of orthogonal modulation signals is performed by generating each transmit signal by modulating the common sine wave signal with a corresponding bit code of the set of orthogonal bit codes, wherein each bit of the corresponding bit code indicates how to modify a carrier frequency of the common sine wave signal.

In another embodiment, a method of detecting a touch event in a touch panel system, wherein the touch panel system includes a touch panel including a first plurality of electrodes and a second plurality of electrodes, wherein the first plurality of electrodes and the second plurality of electrodes define a plurality of crosspoints, the method includes driving a corresponding transmit signal onto each electrode of the first plurality of electrodes, wherein, prior to driving the corresponding transmit signal, generating the corresponding transmit signal by modulating a common sine wave signal with a unique orthogonal modulation signal of a set of orthogonal modulation signals, each orthogonal modulation signal of the set of orthogonal modulation signals corresponding to an electrode of the first plurality of electrodes; and sensing a corresponding receive signal on each electrode of the second plurality of electrodes, wherein, for each corresponding receive signal, generating a set of correlation signals by correlating the corresponding receive signal with each transmit signal driven onto the first plurality of electrodes; and using the sets of correlation signals from the plurality of receivers to detect a touch event on the touch panel. In one aspect, the set of orthogonal modulation signals include a set of orthogonal sine waves, each orthogonal sine wave having a unique frequency from other orthogonal sine waves of the set of orthogonal sine waves, each unique frequency corresponding to a unique electrode of the first plurality of electrodes. In another aspect of the another embodiment, the set of orthogonal modulation signals include a set of orthogonal bit codes.

In yet another embodiment, a touch panel system includes a touch panel including a first plurality of electrodes and a second plurality of electrodes, wherein the first plurality of electrodes and the second plurality of electrodes define a plurality of crosspoints in which each of the plurality of crosspoints is defined by an electrode of the first plurality of electrodes crossing an electrode of the second plurality of electrodes; a plurality of transmitters configured to generate a plurality of transmit signals by modulating a common carrier sine wave signal with a set of orthogonal sine wave signals, each transmit signal generated by modulating the common carrier sine wave signal with a corresponding sine wave signal of the set of orthogonal sine wave signals, each orthogonal sine wave signal having a unique modulation frequency corresponding to a unique electrode of the first plurality of electrodes, and drive each transmit signal onto a corresponding electrode of the first plurality of electrodes, wherein at least two of the plurality of transmit signals are not orthogonal to each other; a plurality of receivers, each receiver configured to sense a receive signal on a corresponding electrode of the second plurality of electrodes and generating a set of correlation signals indicative of amplitudes for each modulation frequency by correlating the receive signal with each transmit signal of the plurality of transmit signals; and a processor configured to process the sets of correlation signals from the plurality of receivers to detect a touch event on the touch panel, wherein the amplitudes of the sets of correlation signals represent an amount of touch of the touch event. In one aspect of the yet another embodiment, each receiver is configured to generate the set of correlation signals indicative of amplitudes for each modulation frequency by performing a Fast Fourier Transform (FFT) of the receive signal corresponding to each unique modulation frequency of the set of orthogonal sine waves. In a further aspect, the set of correlation signals indicates an amount of coupling between the receive signal and each transmit signal of the plurality of transmit signals.

The invention claimed is:

1. A touch panel system, comprising:
a touch panel including a first plurality of electrodes and a second plurality of electrodes, wherein the first plurality of electrodes and the second plurality of electrodes define a plurality of crosspoints;
a plurality of transmitters configured to:
generate a plurality of transmit signals by modulating a common sine wave signal with a set of orthogonal modulation signals, each transmit signal generated by modulating the common sine wave signal with a unique orthogonal modulation signal of the set of orthogonal modulation signals, and
drive each transmit signal onto a corresponding electrode of the first plurality of electrodes, wherein at least two of the plurality of transmit signals are not orthogonal to each other;
a plurality of receivers, each receiver configured to sense a receive signal on a corresponding electrode of the second plurality of electrodes and generating a set of correlation signals by correlating the receive signal with each transmit signal of the plurality of transmit signals; and
a processor configured to process the sets of correlation signals from the plurality of receivers to detect a touch event on the touch panel;
wherein the set of orthogonal modulation signals comprise a set of orthogonal bit codes; and
wherein generating each transmit signal by modulating the common sine wave signal with a unique orthogonal modulation signal of the set of orthogonal modulation signals is performed by:

generating each transmit signal by modulating the common sine wave signal with a corresponding bit code of the set of orthogonal bit codes, wherein each bit of the corresponding bit code indicates how to modify a phase of the common sine wave signal.

2. The touch panel system of claim 1, wherein each correlation signal of the sets of correlation signals indicates an amount of touch of the touch event.

3. The touch panel system of claim 2, wherein each correlation signal of the sets of correlation signals provides corresponding amplitude information which is indicative of the amount of touch of the touch event.

4. The touch panel system of claim 1, wherein none of the plurality of transmit signals are orthogonal to each other.

5. The touch panel system of claim 1, wherein the set of orthogonal modulation signals further includes an extra modulation signal for use in self modulation, wherein each transmit signal is generated by modulating the common sine wave signal using both the unique orthogonal modulation signal and the extra modulation signal of the set of orthogonal modulation signals.

6. The touch panel system of claim 1, wherein the first plurality of electrodes and the second plurality of electrodes are arranged in a grid, wherein the first plurality of electrodes are not coplanar with the second plurality of electrodes, and wherein the first plurality of electrodes are perpendicular to the second plurality of electrodes, and an electrode length of each of the first plurality of electrodes is longer than an electrode length of each electrode of the second plurality of electrodes.

7. The touch panel system of claim 6, wherein the first plurality of electrodes are located along rows of the grid, and the second plurality of electrodes are located along columns of the grid.

8. The touch panel system of claim 1, wherein the common sine wave signal modulated to generate each transmit signal of the plurality of transmit signals share a common central frequency.

9. The touch panel system of claim 8, wherein the set of orthogonal modulation signals comprise a set of orthogonal sine waves, each orthogonal sine wave having a unique frequency from other orthogonal sine waves of the set of orthogonal sine waves.

10. The touch panel system of claim 9, wherein each receiver is configured to generate the set of correlation signals by performing a Fast Fourier Transform (FFT) of the receive signal corresponding to each unique frequency of the set of orthogonal sine waves.

11. The touch panel system of system 10, wherein the set of correlation signals indicates an amount of coupling between the receive signal and each transmit signal of the plurality of transmit signals.

12. A touch panel system, comprising:

a touch panel including a first plurality of electrodes and a second plurality of electrodes, wherein the first plurality of electrodes and the second plurality of electrodes define a plurality of crosspoints;

a plurality of transmitters configured to:

generate a plurality of transmit signals by modulating a common sine wave signal with a set of orthogonal modulation signals, each transmit signal generated by modulating the common sine wave signal with a unique orthogonal modulation signal of the set of orthogonal modulation signals, and drive each transmit signal onto a corresponding electrode of the first plurality of electrodes, wherein at least two of the plurality of transmit signals are not orthogonal to each other;

a plurality of receivers, each receiver configured to sense a receive signal on a corresponding electrode of the second plurality of electrodes and generating a set of correlation signals by correlating the receive signal with each transmit signal of the plurality of transmit signals; and a processor configured to process the sets of correlation signals from the plurality of receivers to detect a touch event on the touch panel;

wherein the set of orthogonal modulation signals comprise a set of orthogonal bit codes; and wherein generating each transmit signal by modulating the common sine wave signal with a unique orthogonal modulation signal of the set of orthogonal modulation signals is performed by:

generating each transmit signal by modulating the common sine wave signal with a corresponding bit code of the set of orthogonal bit codes, wherein each bit of the corresponding bit code indicates how to modify a carrier frequency of the common sine wave signal.

13. A method of detecting a touch event in a touch panel system, wherein the touch panel system comprises a touch panel including a first plurality of electrodes and a second plurality of electrodes, wherein the first plurality of electrodes and the second plurality of electrodes define a plurality of crosspoints, the method comprising:

driving a corresponding transmit signal onto each electrode of the first plurality of electrodes, wherein, prior to driving the corresponding transmit signal, generating the corresponding transmit signal by modulating a common sine wave signal with a unique orthogonal modulation signal of a set of orthogonal modulation signals, each orthogonal modulation signal of the set of orthogonal modulation signals corresponding to an electrode of the first plurality of electrodes, wherein at least two of the plurality of transmit signals are not orthogonal to each other;

sensing a corresponding receive signal on each electrode of the second plurality of electrodes, wherein, for each corresponding receive signal, generating a set of correlation signals by correlating the corresponding receive signal with each transmit signal driven onto the first plurality of electrodes; and using the sets of correlation signals from the plurality of receivers to detect a touch event on the touch panel;

wherein the set of orthogonal modulation signals comprise a set of orthogonal bit codes; and wherein generating each transmit signal by modulating the common sine wave signal with a unique orthogonal modulation signal of the set of orthogonal modulation signals is performed by:

generating each transmit signal by modulating the common sine wave signal with a corresponding bit code of the set of orthogonal bit codes, wherein each bit of the corresponding bit code indicates how to modify a phase of the common sine wave signal.

14. The method of claim 13, wherein the set of orthogonal modulation signals comprise a set of orthogonal sine waves, each orthogonal sine wave having a unique frequency from other orthogonal sine waves of the set of orthogonal sine waves, each unique frequency corresponding to a unique electrode of the first plurality of electrodes.

15. A touch panel system, comprising:

a touch panel including a first plurality of electrodes and a second plurality of electrodes, wherein the first plurality of electrodes and the second plurality of electrodes define a plurality of crosspoints in which each of the plurality of crosspoints is defined by an electrode of the first plurality of electrodes crossing an electrode of the second plurality of electrodes;

a plurality of transmitters configured to:

generate a plurality of transmit signals by modulating a common carrier sine wave signal with a set of orthogonal sine wave signals, each transmit signal generated by modulating the common carrier sine wave signal with a corresponding sine wave signal of the set of orthogonal sine wave signals, each orthogonal sine wave signal having a unique modulation frequency corresponding to a unique electrode of the first plurality of electrodes, and drive each transmit signal onto a corresponding electrode of the first plurality of electrodes, wherein at least two of the plurality of transmit signals are not orthogonal to each other;

a plurality of receivers, each receiver configured to sense a receive signal on a corresponding electrode of the second plurality of electrodes and generating a set of correlation signals indicative of amplitudes for each modulation frequency by correlating the receive signal with each transmit signal of the plurality of transmit signals; and a processor configured to process the sets of correlation signals from the plurality of receivers to detect a touch event on the touch panel, wherein the amplitudes of the sets of correlation signals represent an amount of touch of the touch event;

wherein the set of orthogonal modulation signals comprise a set of orthogonal bit codes; and wherein the plurality of transmitters configured to generate each transmit signal by modulating the common sine wave signal with a unique orthogonal modulation signal of the set of orthogonal modulation signals is performed by:

the plurality of transmitters configured to generate each transmit signal by modulating the common sine wave signal with a corresponding bit code of the set of orthogonal bit codes, wherein each bit of the corresponding bit code indicates how to modify a carrier frequency of the common sine wave signal.

16. The touch panel system of claim 15, wherein each receiver is configured to generate the set of correlation signals indicative of amplitudes for each modulation frequency by performing a Fast Fourier Transform (FFT) of the receive signal corresponding to each unique modulation frequency of the set of orthogonal sine waves.

17. The touch panel system of system 16, wherein the set of correlation signals indicates an amount of coupling between the receive signal and each transmit signal of the plurality of transmit signals.

18. A touch panel system, comprising:

a touch panel including a first plurality of electrodes and a second plurality of electrodes, wherein the first plurality of electrodes and the second plurality of electrodes define a plurality of crosspoints;

a plurality of transmitters configured to:

generate a plurality of transmit signals by modulating a common sine wave signal with a set of orthogonal modulation signals, each transmit signal generated by modulating the common sine wave signal with a unique orthogonal modulation signal of the set of orthogonal modulation signals, and drive each transmit signal onto a corresponding electrode of the first plurality of electrodes, wherein at least two of the plurality of transmit signals are not orthogonal to each other;

a plurality of receivers, each receiver configured to sense a receive signal on a corresponding electrode of the second plurality of electrodes and generating a set of correlation signals by correlating the receive signal with each transmit signal of the plurality of transmit signals;

a processor configured to process the sets of correlation signals from the plurality of receivers to detect a touch event on the touch panel; and wherein generating each transmit signal by modulating the common sine wave signal with a unique orthogonal modulation signal of the set of orthogonal modulation signals comprises: generating each transmit signal by modulating a phase of the common sine wave signal with a sine wave having a unique modulation frequency corresponding to a unique electrode of the first plurality of electrodes.

* * * * *